Jan. 3, 1928.

H. DE B. KNIGHT 1,654,937

REGULATION OF ELECTRIC DISTRIBUTION SYSTEMS

Original Filed July 27, 1926

Inventor:
Henry de B. Knight,
by
His Attorney.

Patented Jan. 3, 1928.

1,654,937

UNITED STATES PATENT OFFICE.

HENRY DE BOYNE KNIGHT, OF RUGBY, ENGLAND, ASSIGNOR TO GENERAL ELECTRIC COMPANY, A CORPORATION OF NEW YORK.

REGULATION OF ELECTRIC DISTRIBUTION SYSTEMS.

Application filed July 27, 1926, Serial No. 125,309, and in Great Britain April 15, 1926. Renewed November 11, 1927.

My invention relates to the regulation of the supply of electric current particularly from direct current supply means such as rotary converters, generators, rectifiers or the like which are operating in parallel with vapor electric discharge devices such as mercury arc rectifiers, or tungar rectifiers in which the voltage of the direct current output can be controlled by control electrodes. Cases frequently arise in which it is desirable to operate the source or current supply means at one particular load, arranging for the vapor electric discharge device with which it is in parallel to take up the remaining load of the system. For example, if a rotary converter and a mercury arc rectifier where operating in parallel it would generally be of advantage for the rotary converter to run under the particular electrical condition at which it has highest efficiency, which might in this case be its full rated load, while the mercury arc rectifier took up the peaks of load; since the latter has a high efficiency at light loads, the complete equipment would operate at its maximum overall efficiency.

The principal object of my invention is to provide a system which operates firstly so as to increase the voltage of the direct current output of the vapor electric discharge device, thus causing it to take more of the load, at any change in total load under which the unit in parallel with it would tend to increase its output; or secondly, in a similar manner, to cause the former to take up the greater part of the increase of the load while the latter takes up only a predetermined smaller increase in load, keeping within its limits of best efficiency; the reverse operation taking place when the total load decreases.

The parallel operation will be practically independent of the load characteristics of the units, which may be designed without reference to parallel operation; for example, difficulties at present experienced in the parallel operation of compound wound rotary units will be minimized, if not eliminated.

Figure 1:
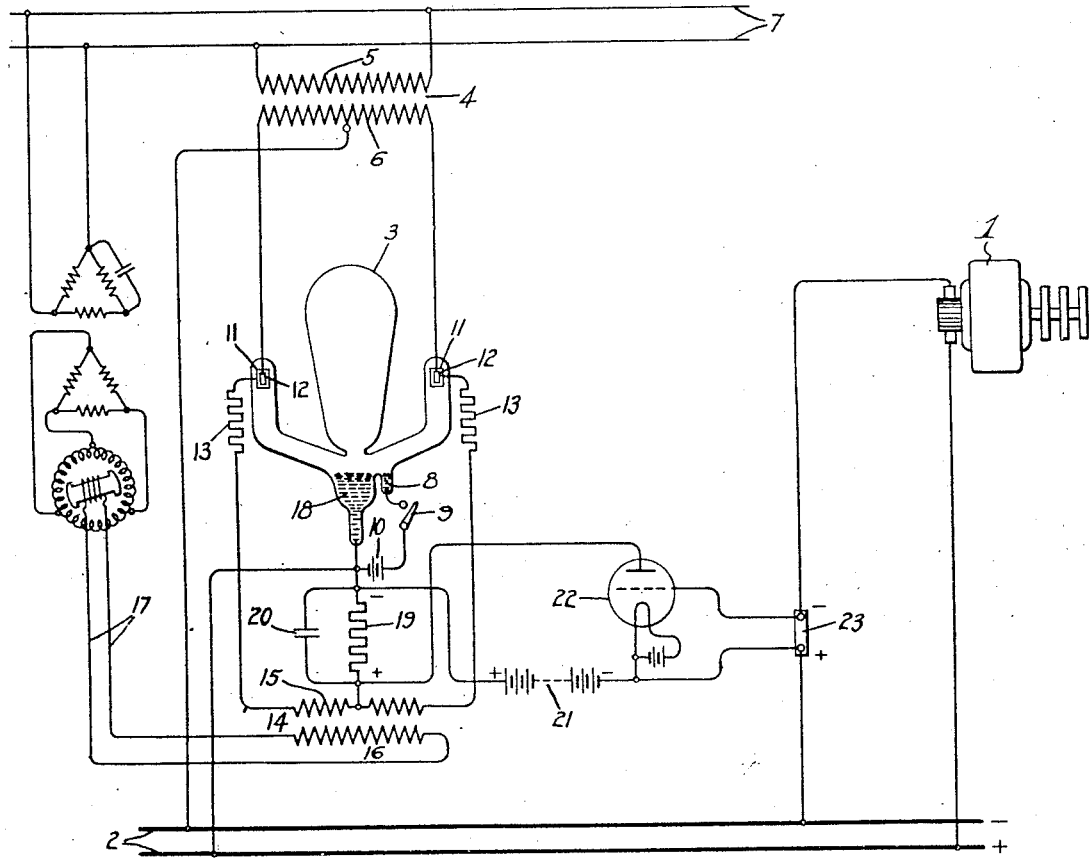
Figure 2:
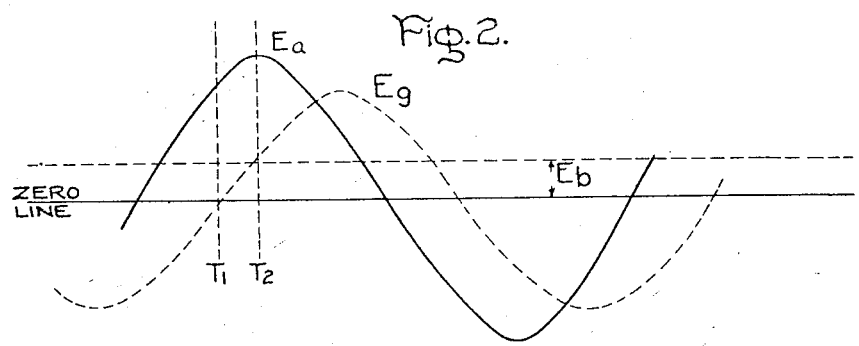

The accompanying drawings illustrate this invention Fig. 1 illustrating diagrammatically a system in which a mercury arc rectifier is coupled in parallel with a generator and Fig. 2 shows curves of the voltage of the rectifier.

The method by which the voltage output of the vapor electric discharge device is controlled will be understood from Fig. 2 of the attached drawings in which $E_a$ represents the alternating current voltage of supply to an anode; $E_g$ represents the voltage, (with respect to the cathode), of the control electrode associated with the anode. It is found that although $E_a$ is positive, the arc will not strike to this anode while $E_g$ is negative; the arc strikes when $E_g$ changes from negative to zero, at time $T_1$ in Fig. 2. Thus if the time $T_1$ be altered, the amount of the positive half wave of $E_a$ that will be rectified is altered, and hence the average rectified voltage is altered.

The present invention will be understood by reference to Fig. 1 of the attached drawings in which 1 represents a direct current source of supply to mains 2; it is shown as the armature of a rotary machine; and may represent a rotary converter, motor converter generator, rectifier or other source of direct current. This unit operates in parallel with a vapor electric discharge device shown as a single phase mercury arc rectifier 3, but it will be understood that any suitable rectifying device may be used.

The rectifier 3 is supplied with alternating current in the usual way from alternating current mains 7, through a suitable transformer 4, shown as consisting of a primary winding 5 and a secondary winding 6; the neutral point of the latter, and the cathode 18 of the rectifier being connected through the usual choke coils and other auxiliaries as required to the negative and positive lines respectively of mains 2.

Rectifier 3 comprises a cathode 18; ignition device shown as an ignition electrode 8, switch 9, and battery 10; anodes 12, connected to alternating current supply; and a control electrode 11 associated with each anode. Each control electrode is connected to the cathode 18 through its own resistor 13, a section of the secondary 15 of a transformer 14, and an impedance device shown as a common resistor 19 which connects the neutral point of secondary 15 to the cathode 18 and which may if desired be shunted by a smoothing condenser 20. The primary winding 16 of transformer 14 is connected through leads 17 to the alternating current mains 7 through a phase shifting device, such as a phase shifting transformer or induction regulator. The phase of $E_g$ may be varied as required with respect to the anode voltage $E_a$, and moment $T_1$ may also be varied, as shown in Fig. 2.

The voltage $E_g$ of the control electrode is also varied by a bias voltage due to the drop in potential in resistor 19, through which a current passes from a battery 21. In the circuit of this current is also a thermionic valve 22. The filament of the latter may be made incandescent in the usual manner; and it may be desirable to put on the grid a biassing potential in any convenient manner as determined by the characteristics of the particular type of thermionic valve employed.

The grid and filament of valve 22 are connected across a resistor or shunt 23 placed in one of the output lines of direct current source 1, and between 1 and the direct current mains 2.

With connections as shown, with shunt 23 in the negative line, and the grid of 22 connected to the negative end of the shunt, the operation is as follows: With predetermined current flowing through 1 there will be a certain negative grid potential on valve 22. corresponding to the drop in potential in shunt 23. There will therefore be a corresponding voltage drop in resistor 19, due to current from battery 21, the effect of which will be to put a negative bias potential on the control electrodes 11. In Fig. 2, the effect of this is to displace the zero line of the control electrode volts $E_g$ a distance in the positive direction equal to $E_b$, the biassing voltage drop across resistor 19. Thus the control electrode potential changes from negative to zero, and the rectifier valve opens, at instant $T_2$ instead of $T_1$. The position of $T_2$, and hence the mean value of rectified volts, may be controlled by means of the phase shifting device supplying transformer 14.

If, now, the current in 23 rises, the negative potential on the grid of thermionic valve 22 will increase; consequently the voltage drop $E_b$ across resistor 19 will decrease. This will have the effect of opening the valve of rectifier 1 at a time earlier than $T_2$, thus increasing the direct current volts of the rectifier, and causing it to take a greater share of the load.

Similarly, if the current in 23 falls, the time of opening of the rectifier valve will be later than $T_2$, since $E_b$ has increased; thus the direct current volts of the rectifier will decrease, causing it to take a smaller share of the load.

Either action will serve to restore the load of the unit 1 to its predetermined value.

The exact circuit whereby the variation in voltage drop across shunt 23 operates to vary the biassing potential drop across the resistor 19 may be altered without going outside the scope of this invention. For example, two or more valves may be used instead of the single valve 22, in order to amplify the effect. Also the characteristics of the circuit may be so chosen as to confine the load of unit 1 within very narrow limits, so that a very slight change in its load will cause the vapor electric discharge device to take up all the load fluctuation; or to confine the load of unit 1 within a broader load range over which its efficiency is high, so that while unit 1 takes up a small portion of the change in load, the greater part of the change is taken up by the vapor electric discharge device.

What I claim as new and desire to secure by Letters Patent of the United States is:

1. The combination of direct and alternating current circuits, current supply means connected to one of said circuits, a vapor electric device provided with a cathode and anode connected between said circuits and with an electrode for controlling the transmission of current between said cathode and anode, and means for applying to said control electrode a potential which is dependent on an electrical condition of said supply means.

2. The combination of direct and alternating current circuits, current supply means connected to one of said circuits, a vapor electric device provided with a cathode and anode connected between said circuits and with an electrode for controlling the transmission of current between said cathode and anode, and means comprising an electrical valve for applying to said control electrode a negative potential which is dependent on an electrical condition of said supply means.

3. The combination of direct and alternating current circuits, current supply means connected to one of said circuits, a vapor electric device provided with a cathode and anode connected between said circuits and with an electrode for controlling the transmission of current between said cathode and anode, an impedance device connected between said cathode and control electrode, and means for supplying to said impedance device a potential which is dependent on an electrical condition of said supply means.

4. The combination of direct and alternating current circuits, current supply means connected to one of said circuits, a vapor electric device provided with a cathode and anode connected between said circuits and with an electrode for controlling the transmission of current between said cathode and anode, an impedance device connected between said cathode and control electrode, and an electrical valve provided with a plate circuit connected to said impedance device and with a grid circuit connected to said supply means.

5. The combination of direct and alternating current circuits, current supply means connected to one of said circuits, a vapor electric device provided with a cathode and anode connected between said circuits and with an electrode for controlling the transmission of current between said cathode and anode, and an electrical valve provided with a plate circuit connected between said cathode and anode and with a grid circuit arranged to have its potential controlled in accordance with an electrical condition of said supply means.

6. The combination of direct and alternating current circuits, current supply means connected to said direct current circuit, a device provided with a cathode and anode connected between said circuits and with a control electrode, and means operable in accordance with the load of said supply means for controlling the potential of said control electrode.

7. The combination of direct and alternating current circuits, current supply means connected to said direct current circuit, a device provided with a cathode and anode connected between said circuits and with a control electrode, means operable in accordance with the load of said supply means for controlling the potential of said control electrode, and means for controlling the phase relation between the potentials of said anode and control electrode.

8. The combination of a direct current circuit, a rotary converter connected to said circuit, a vapor electric device provided with a cathode and an anode connected to said circuit and with a control electrode, and means connected between said cathode and control electrode for controlling the potential of said electrode in accordance with the current of said converter.

9. The combination of direct and alternating current circuits, current supply means connected to one of said circuits, a device provided with a cathode and an anode connected between said circuits and with a control electrode, means connected between said cathode and control electrode for applying to said electrode a potential which is dependent on an electrical condition of said supply means, and means for controlling the phase relation between the potentials of said anode and control electrode.

10. The combination of direct and alternating current circuits, current supply means connected to one of said circuits, a device provided with a cathode and anode connected between said circuits and with an electrode for controlling the transmission of current between said cathode and anode, and means for applying to said control electrode a potential which is dependent on an electrical condition of said supply means.

In witness whereof, I have hereunto set my hand this seventh day of July 1926.

HENRY DE BOYNE KNIGHT.